United States Patent
Zhong et al.

(10) Patent No.: US 7,368,173 B2
(45) Date of Patent: May 6, 2008

(54) SILOXANE RESIN-BASED ANTI-REFLECTIVE COATING COMPOSITION HAVING HIGH WET ETCH RATE

(75) Inventors: Bianxiao Zhong, Midland, MI (US); Eric S. Moyer, Midland, MI (US)

(73) Assignee: Dow Corning Corporation, Auburn, MI (US)

( * ) Notice: Subject to any disclaimer, the term of this patent is extended or adjusted under 35 U.S.C. 154(b) by 182 days.

(21) Appl. No.: 10/552,432

(22) PCT Filed: May 20, 2004

(86) PCT No.: PCT/US2004/016265

§ 371 (c)(1), (2), (4) Date: Oct. 5, 2005

(87) PCT Pub. No.: WO2004/113417

PCT Pub. Date: Dec. 29, 2004

(65) Prior Publication Data

US 2006/0194916 A1    Aug. 31, 2006

(51) Int. Cl.
    *C08G 77/12* (2006.01)
(52) U.S. Cl. .................. 428/447; 427/387; 528/31; 528/29; 528/43
(58) Field of Classification Search .............. 528/31, 528/29, 43; 427/387; 428/447
    See application file for complete search history.

(56) References Cited

U.S. PATENT DOCUMENTS

| | | | |
|---|---|---|---|
| 4,587,138 A | 5/1986 | Yau et al. | 438/660 |
| 5,100,503 A | 3/1992 | Allman et al. | 438/694 |
| 5,210,168 A | 5/1993 | Bergstrom et al. | 528/12 |
| 5,441,765 A | 8/1995 | Ballance et al. | 427/228 |
| 5,708,099 A | 1/1998 | Kushibiki et al. | 525/477 |
| 6,057,239 A | 5/2000 | Wang et al. | 438/689 |
| 6,156,640 A | 12/2000 | Tsai et al. | 438/636 |
| 6,268,457 B1 | 7/2001 | Kennedy et al. | 528/39 |
| 6,329,118 B1 | 12/2001 | Hussein et al. | 430/270.1 |
| 6,344,284 B1 | 2/2002 | Chou | 428/690 |
| 6,365,765 B1 | 4/2002 | Baldwin et al. | 556/440 |
| 6,368,400 B1 | 4/2002 | Baldwin et al. | 106/481 |
| 6,395,397 B2 | 5/2002 | Hong et al. | 428/413 |
| 6,420,088 B1 | 7/2002 | Angelopoulos et al. | 430/272.1 |
| 6,461,955 B1 | 10/2002 | Tsu et al. | 438/618 |
| 6,503,692 B2 | 1/2003 | Angelopoulos et al. | 430/310 |
| 6,506,497 B1* | 1/2003 | Kennedy et al. | 428/447 |
| 6,515,073 B2* | 2/2003 | Sakamoto et al. | 525/100 |
| 6,589,711 B1 | 7/2003 | Subramanian et al. | 430/311 |
| 6,596,405 B2 | 7/2003 | Zampini et al. | 257/E21.273 |
| 6,599,951 B2 | 7/2003 | Zampini et al. | 521/50 |
| 6,746,530 B2 | 6/2004 | Wang | 106/287.16 |
| 6,924,346 B2 | 8/2005 | Boisvert et al. | 528/31 |
| 6,982,006 B1* | 1/2006 | Boyers et al. | 134/3 |
| 2001/0036998 A1 | 11/2001 | Sakamoto et al. | 525/100 |
| 2002/0042020 A1 | 4/2002 | Gallagher et al. | 430/272.1 |
| 2002/0095018 A1 | 7/2002 | Baldwin et al. | 528/39 |
| 2002/0128388 A1 | 9/2002 | Kennedy et al. | 525/100 |
| 2002/0195419 A1 | 12/2002 | Pavelchek | 216/16 |
| 2003/0199659 A1 | 10/2003 | Baldwin et al. | 528/10 |
| 2003/0209515 A1 | 11/2003 | Pavelchek | 216/16 |

FOREIGN PATENT DOCUMENTS

| | | |
|---|---|---|
| WO | WO00/77575 | 12/2000 |
| WO | WO02/06402 | 1/2002 |
| WO | WO03/044077 | 5/2003 |
| WO | WO03/044078 | 5/2003 |
| WO | WO03/089992 | 10/2003 |
| WO | WO2004/044025 | 5/2004 |
| WO | WO2004/051376 | 6/2004 |
| WO | 2005/034236 | 9/2005 |
| WO | 2005/034677 | 9/2005 |
| WO | 2005/035235 | 9/2005 |
| WO | 2005/035236 | 9/2005 |

OTHER PUBLICATIONS

Kirk-Othmer Encyclopedia of Chemical Technology, "Silicon Compounds, Silicon Esters", 2001, pp. 3-4.*
Kennedy et al., *Proc. of SPIE* 5039:929-939 (2003).
Kennedy et al., *Proc. of SPIE* 5039:144-151 (2003).

* cited by examiner

Primary Examiner—Margaret G. Moore
(74) Attorney, Agent, or Firm—Williams, Morgan & Amerson, P.C.

(57) ABSTRACT

Herein we disclose a composition, comprising a siloxane resin having the formula $(HSiO_{3/2})_a \cdot (SiO_{4/2})_b (HSiX_{3/2})_c (SiX_{4/2})_d$, wherein each X is independently —O—, —OH, or —O—$(CH_2)_m$—$Z_n$, wherein each m is independently an integer from 1 to about 5, Z is an 5 aromatic moiety, and each n is independently an integer from 1 to about 6; $0<a<1$, $0<b<1$, $0<c<1$, $0<d<1$, and $a+b+c+d=1$. We also disclose methods for preparing the siloxane resin composition and a method of preparing an anti-reflective coating on a substrate, wherein the anti-reflective coating is derived from the siloxane resin composition.

18 Claims, No Drawings

SILOXANE RESIN-BASED ANTI-REFLECTIVE COATING COMPOSITION HAVING HIGH WET ETCH RATE

BACKGROUND OF THE INVENTION

The present invention relates generally to the field of antireflective coatings for use in fabricating semiconductor devices. More particularly, it relates to antireflective coatings formed from dyed siloxane resins.

Photolithography is a known technique in the art of semiconductor fabrication. In a typical photolithography process, a semiconductor wafer is coated with a barrier layer, aka. an anti-reflective coating (ARC) layer. Thereafter, a photoresist layer is coated on the ARC layer. The photoresist/ARC/semiconductor wafer is then brought into proximity to a source of electromagnetic radiation (EM), typically ultraviolet light (UV) having a wavelength from about 150 nm to about 300 nm, and a mask is interposed between the EM source and the photoresist/ARC/semiconductor wafer. The mask is generally opaque to the wavelength of EM used, but has transparent regions defining a desired pattern to be imparted to the photoresist layer.

When the source emits EM, the mask allows exposure of EM to particular and user-defined regions of the photoresist layer. Both positive photoresists and negative photoresists are known. In a positive photoresist, the regions of photoresist exposed to UV, as well as the regions of the ARC layer thereunder, will be sacrificed during subsequent developing steps. In a negative photoresist, the regions of photoresist which are not exposed to UV, as well as the regions of the ARC layer thereunder, will be sacrificed during subsequent developing steps.

Regardless of the details of the photolithography process, an ARC layer desirably has several properties. One property is a relatively high extinction coefficient, i.e., a relatively strong ability to absorb the wavelength of EM used, rather than reflect the EM up to the photoresist layer. A second property is a relatively low resistance to liquid stripping agents, such as diluted hydrofluoric acid, in order to more quickly and easily be removed after photolithography and minimize the extent of damage by a stripping agent to the low-k dielectric material on a wafer.

SUMMARY OF THE INVENTION

In one embodiment, the present invention relates to a composition, comprising a dyed siloxane resin having the formula $(HSiO_{3/2})_a(SiO_{4/2})_b(HSiX_{3/2})_c(Si_{4/2})_d$, wherein each X is independently —O—, —OH, or —O—$(CH_2)_m$—$Z_n$, provided at least one X is —O—$(CH_2)_m$—$Z_n$, wherein $Z_n$ is a polycyclic aromatic hydrocarbon moiety comprising n aromatic rings, each m is independently an integer from 1 to about 5, and each n is independently an integer from 1 to about 6; $0<a<1$, $0<b<1$, $0<c<1$, $0<d<1$, and $a+b+c+d=1$.

In another embodiment, the present invention relates to a method for preparing a siloxane resin composition, comprising reacting a trialkoxysilane, a tetraalkoxysilane, and water in the presence of a hydrolysis catalyst, to form a siloxane resin having $HSiO_{3/2}$, $SiO_{4/2}$, $(HSiX_{3/2})$ and $SiX'_{4/2}$ units, wherein X' is independently —O— or —OH, and having substantially no silicon-carbon bonds; and reacting the siloxane resin with a compound having the formula HO—$(CH_2)_m$—$Z_n$, wherein each m is independently an integer from 1 to about 5, and each n is independently an integer from 1 to about 6, to form the siloxane resin composition. The method can be performed as sequential steps or a single step.

In a further embodiment, the present invention relates to a method of preparing an anti-reflective coating on a substrate, comprising coating a composition onto a substrate to form a coated substrate, wherein the composition comprises a siloxane resin having the formula $(HSiO_{3/2})_a(SiO_{4/2})_b(HSiX_{3/2})_c(SiX_{4/2})_d$, wherein each X is independently —O—, —OH, or —O—$(CH_2)_m$—$Z_n$, provided at least one X is —O—$(CH_2)_m$—$Z_n$, wherein $Z_n$ is a polycyclic aromatic hydrocarbon moiety comprising n aromatic rings, wherein each m is independently an integer from 1 to about 5, and each n is independently an integer from 1 to about 6; $0<a<1$, $0<b<1$, $0<c<1$, $0<d<1$, and $a+b+c+d=1$; and curing the coated substrate, to form the anti-reflective coating on the substrate.

In yet another embodiment, the present invention relates to a semiconductor wafer, prepared according to the above method of preparing an anti-reflective coating on a substrate.

The dyed siloxane resin compositions of the present invention provide ARC layers having relatively high extinction coefficients for UV having wavelengths from about 150 nm to about 300 nm, and a relatively low resistance to liquid stripping agents such as dilute hydrofluoric acid, a.k.a. a high wet etch rate.

DESCRIPTION OF ILLUSTRATIVE EMBODIMENTS

In one embodiment, the present invention relates to a composition, comprising a siloxane resin having the formula:

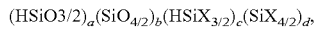

wherein each X is independently —O—, —OH, or —O—$(CH_2)_m$—$Z_n$, provided at least one X is —O—$(CH_2)_m$—$Z_n$, wherein $Z_n$ is a polycyclic aromatic hydrocarbon moiety comprising n aromatic rings, wherein each m is independently an integer from 1 to about 5, and each n is independently an integer from 1 to about 6; $0<a<1$, $0<b<1$, $0<c<1$, $0<d<1$, and $a+b+c+d=1$.

The $HSiO_{3/2}$ and $SiO_{4/2}$ units are well known to the skilled artisan. Typically, a small proportion of "$SiO_{4/2}$" units comprise some one or more silanol (Si—OH) moieties, that is, some $SiO_{4/2}$ units can have formulas such as HO—$SiO_{3/2}$, $(HO)_2SiO2/2$, etc. and remain within the scope of the term "$SiO_{4/2}$ units."

The $HSiX_{3/2}$ units, as hereby defined, refer to units comprising one or more of the following structures. For convenience, only one of the three non-H silicon valences is shown in each of the following structures; the two valences not shown can be selected from any of the following structures. In one structure, wherein an X is —O—; the $HSiX_{3/2}$ unit will comprise Si—O—, by which is meant that the oxygen of the X moiety is bonded to a silicon atom of another unit of the resin. In another structure, wherein an X is —OH, the $HSiX_{3/2}$ unit will comprise Si—OH, which can be referred to as a silanol moiety. In a third structure, wherein an X is —O—$(CH_2)_m$—$Z_n$, the $HSiX_{3/2}$ unit will comprise Si—O—$(CH_2)_m$—$Z_n$.

The $SiX_{4/2}$ units, as hereby defined, refer to units comprising one or more of the following structures. For convenience, only one of the four silicon valences is shown in each of the following structures; the three valences not shown can be selected from any of the following structures, provided at least one X is —O—$(CH_2)_m$—$Z_n$. In one structure, wherein an X is —O—, the SiX$_{4/2}$ unit will comprise Si—O—, by which is meant that the oxygen of the X moiety is bonded to a silicon atom of another unit of the resin. In another structure, wherein an X is —OH, the SiX$_{4/2}$ unit will comprise Si—OH, which can be referred to as a silanol moiety. In a third structure, wherein an X is —O—(CH$_2$)$_m$—Z$_n$, the SiX$_{4/2}$ unit will comprise Si—O—(CH$_2$)$_m$—Z$_n$.

The term "Z$_n$" as used herein, refers to a substituted or an unsubstituted polycyclic aromatic hydrocarbon moiety comprising n aromatic rings, wherein n is from 1 to about 6; e.g., phenyl, naphthalenyl, phenanthrenyl, anthracenyl, chrysenyl, pyrenyl, or coronenyl moieties, among others. In one embodiment, X is independently —O—, —OH, or —O—(CH$_2$)—Z$_3$, provided at least one X is —O—(CH$_2$)$_m$—Z$_3$. In one embodiment, —(CH$_2$)$_m$—Z$_3$ is a 9-anthracene methylene moiety (i.e., m=1).

The proportions of the various units of the resin can vary, provided that the mole fractions of each are between 0 and 1 (i.e., 0<a<1, 0<b<1, 0<c<1, 0<d<1) and the sum of the mole fractions is 1. In one embodiment, the mole fractions have the values 0.3≦a≦0.7, 0.3≦b≦0.7, and 0<(c+d)≦0.6.

The composition can further comprise an organic solvent. Exemplary solvents include, but are not limited to, 2-ethoxyethanol, 1-methoxy-2-propanol, and propylene glycol monoether, among others. The composition can comprise from about 80% to about 99% solvent by weight. The composition can further comprise additional components useful in coating applications or in other applications for which the composition can be used. In one embodiment, the composition further comprises water. The composition can comprise from about 0% to about 15% water by weight. In another embodiment, the composition further comprises a non-volatile acid such as sulfuric acid (H$_2$SO$_4$), which may facilitate the curing of the thin film at a moderately low temperature. The composition can comprise from about 0 ppm (parts per million of total composition by weight) to about 500 ppm acid.

In one embodiment, the present invention relates to a method for preparing a siloxane resin composition, comprising:

(i) reacting a trialkoxysilane, a tetraalkoxysilane, and water in the presence of a hydrolysis catalyst, to form a first siloxane resin having HSiO$_{3/2}$, SiO$_{4/2}$, HSiX'$_{3/2}$, and SiX'$_{4/2}$ units, wherein X' is independently —O— or —OH, and having substantially no silicon-carbon bonds; and (ii) reacting the first siloxane resin with a compound having the formula HO—(CH$_2$)$_m$—Z$_n$, wherein each m is independently an integer from 1 to about 5, and each n is independently an integer from 1 to about 6, to form the siloxane resin composition.

In reacting step (i), a trialkoxysilane, a tetraalkoxysilane, and water can be reacted in the presence of a hydrolysis catalyst, to form the first siloxane resin.

A "trialkoxysilane," as used herein, is a compound having the formula HSiR$_3$, wherein each R is independently a C$_1$-C$_6$ alkoxy moiety. Exemplary alkoxy moieties include, but are not limited to, methoxy, n-propoxy, and n-butoxy moieties, among others. In one embodiment, the trialkoxysilane is triethoxysilane (HSi(OCH$_2$CH$_3$)$_3$).

A "tetraalkoxysilane," as used herein, is a compound having the formula SiR$_4$, wherein each R is independently a C$_1$-C$_6$ alkoxy moiety as described above. In one embodiment, the tetraalkoxysilane is tetraethoxysilane (Si(OCH$_2$CH$_3$)$_4$).

The weight ratio of trialkoxysilane:tetraalkoxysilane can be from 0:1 to 1:0. The higher the weight ratio of trialkoxysilane:tetraalkoxysilane, the greater the mole fraction ratio of HSiO$_{3/2}$ to SiO$_{4/2}$ units in the first siloxane resin. The trialkoxysilane and the tetraalkoxysilane may be referred to collectively as "alkoxysilanes."

The amount of water in the reaction (i) can be from about 2 molar parts per molar part of alkoxysilanes to about 15 molar parts per molar part of alkoxysilanes. In one embodiment, the amount of water is from about 3 molar parts per molar part of alkoxysilanes to about 5 molar parts per molar part of alkoxysilanes. Though not to be bound by theory, the inclusion of water in the reaction (i) is believed to lead to the formation of silanol (Si—OH) moieties. Some, but typically not all, of the silanol moieties are believed to undergo condensation reactions with other silanol moieties (Si—OH+HO—Si) to form silica linkages (Si—O—Si) and water (H$_2$O). The remaining silanol moieties remain condensed and thus are potentially reactive with alcohol moieties.

Generally, alkoxysilanes are either not soluble in water or sparingly soluble in water. In light of this, the reaction (i) can be performed in an organic solution, by which is meant, the alkoxysilanes can be dissolved in an organic solvent in which they are either relatively highly soluble or miscible. In one embodiment, the organic solvent is 2-ethoxyethanol. In another embodiment, the organic solvent is 1-methoxy-2-propanol. An organic solvent can be present in any amount sufficient to dissolve the other components of the reaction mixture. In one embodiment, the weight ratio of organic solvent:alkoxysilanes is at least about 10:1. In another embodiment, the organic solvent is present from about 70% to about 99% by total weight of the reaction mixture.

Alternatively, the reaction (i) can be performed in suspension in aqueous solution, or in emulsion in aqueous solution, wherein in the latter technique an appropriate surfactant or cosolvent can be used to render the alkoxysilanes at least relatively highly soluble in aqueous solution.

The temperature of the reacting step (i) is not crucial, provided it is a temperature at which the first siloxane resin can form.

The duration of the reacting step (i) is not crucial, provided it is sufficiently long for the reaction to go to a desired level of completeness.

The reacting step (i) can be performed in the presence of a catalyst which promotes the reaction (a "hydrolysis catalyst"). The catalyst can be a base or an acid. In one embodiment, reacting step (i) can be performed in the presence of a mineral acid. Useful mineral acids include, but are not limited to, HCl, HF, HBr, HNO$_3$, and H$_2$SO$_4$, among others. In one embodiment, the catalyst is HCl. The benefit of HCl or other volatile acids is that a volatile acid can be easily removed from the composition by stripping after the reaction (i) is completed. The amount of catalyst may depend on its nature. For example, when the catalyst is HCl, 0.05% to 1% of HCl by total weight of the reaction mixture can be used.

The first siloxane resin will have substantially no silicon-carbon bonds, i.e., less than about 5 mol % of all atoms bonded to silicon atoms will be carbon. However, some few silicon-carbon bonds may form as a result of the reaction, such as through low levels of side reactions or by the presence of reactant contaminants having silicon-carbon bonds.

In reacting step (ii), the first siloxane resin can be reacted with a compound having the formula HO—(CH$_2$)$_m$—Z$_n$, wherein each m is independently an integer from 1 to about 5, and each n is independently an integer from 1 to about 6, to form the siloxane resin composition.

Compounds having the formula HO—(CH$_2$)$_m$—Z$_n$ are known in the art and frequently have dye properties, by which is meant they have relatively high extinction coefficients at one or more wavelengths of electromagnetic (EM) radiation, such as wavelengths within the ultraviolet region of the EM spectrum. A relatively high extinction coefficient leads to a relatively high absorbance and a relatively low transmission of EM radiation at the one or more wavelengths. In one embodiment, the compound having the formula HO—$(CH_2)_m$—$Z_n$ is 9-anthracenemethanol. In another embodiment, the compound is hydroxybenzyl alcohol. In yet another embodiment, the compound is benzyloxybenzyl alcohol.

Reacting step (ii) can be performed by adding the compound having the formula HO—$(CH_2)_m$—$Z_n$ to the solution, suspension, or emulsion containing the first siloxane resin. Optionally, compounds such as water or a non-volatile mineral acid, such as H2SO4, can be added before or after the reacting step (ii). In one embodiment, the amount of water is from about 0 to about 15 weight parts per 100 weight parts of the total composition. In one embodiment, the amount of non-volatile mineral acid is from about 0 to about 500 parts per million parts of total composition in weight.

The compound HO—$(CH_2)_m$—$Z_n$ can be present at from about 1 wt part compound: 1 wt part first siloxane resin to about 1 wt part compound:10 wt part first siloxane resin.

The temperature for reacting step (ii) is not crucial, provided it is a temperature at which the compound having the formula HO—$(CH_2)_m$—$Z_n$ can react with silanol moieties of the first siloxane resin. In one embodiment, reacting step (ii) can be performed at a temperature from about 25° C. to about the boiling temperature of a reaction component (the resin, the compound having the formula HO—$(CH_2)_m$—$Z_n$, the solvent if any, or the water if any, among other compounds whose presence in the second reaction mixture may be desirable).

The duration of reacting step (ii) is not crucial, provided it is sufficiently long for the reaction of the compound having the formula HO—$(CH_2)_m$—$Z_n$ with silanol moieties of the first siloxane resin to go to a desired level of completion. In one embodiment, the duration of reacting step (ii) can be about 10 min to about 60 min.

Reacting step (ii) can be performed in the presence of a catalyst which promotes the reaction between the compound having the formula HO—$(CH_2)_m$—$Z_n$ and silanol moieties of the first siloxane resin. The catalyst can be a base or an acid. In one embodiment, reacting step (ii) can be performed in the presence of a mineral acid.

As a result of reacting step (ii), the first siloxane resin is substituted with an —O—$(CH_2)_m$—$Z_n$ moiety. Because this moiety has dye properties, the product can be referred to as a "dyed siloxane resin."

Reacting steps (i) and (ii) can be performed sequentially or simultaneously. In simultaneous performance, the alkoxysilanes, the water, and the compound having the formula HO—$(CH_2)_m$—$Z_n$ are reacted in the presence of a hydrolysis catalyst to form the dyed siloxane resin.

In another embodiment, the present invention relates to a method of preparing an anti-reflective coating on a substrate, comprising:

coating a composition onto a substrate to form a coated substrate, wherein the composition comprises a siloxane resin having the formula $(HSiO_{3/2})_a(SiO_{4/2})_b(HSiX_{3/2})_c(SiX_{4/2})_d$, wherein each X is independently —O—, —OH, or —O—$(CH_2)_m$—$Z_n$, provided at least one X is —O—$(CH_2)_m$—$Z_n$, wherein $Z_n$, is a polycyclic aromatic hydrocarbon moiety comprising n aromatic rings, wherein each m is independently an integer from 1 to about 5, and each n is independently an integer from 1 to about 6; 0<a<1, 0<b<1, 0<c<1, 0<d<1, and a+b+c+d=1; and curing the coated substrate, to form the anti-reflective coating on the substrate.

In the coating step, the composition has been described above. The presence of —O—$(CH_2)_m$—$Z_n$ in the siloxane resin imparts anti-reflective properties to the siloxane resin. The substrate can be any material which it is desirable to coat with the siloxane resin of the composition. In one embodiment, the substrate is a semiconductor wafer, such as a silicon wafer. Typically, the wafer can comprise at least one semiconductive layer and a plurality of other layers comprising various conductive, semiconductive, or insulating materials.

Coating can be performed by any appropriate technique. In one embodiment, the coating can be performed by coating. Typically, coating involves spinning the substrate, such as at about 2000 RPM, and adding the solution to the surface of the spinning substrate.

The coated substrate is cured to form the anti-reflective coating on the substrate. Curing generally comprises heating the coated substrate to a sufficient temperature for a sufficient duration to lead to curing. In one embodiment, the coated substrate can be heated at about 50° C. to about 300° C. for a duration of about 0.1 min to about 60 min. In another embodiment, the coated substrate can be heated at about 150° C. to about 275° C. for a duration of about 1 min to about 5 min.

To protect the dyed siloxane resin of the coated composition from reactions with oxygen or carbon during curing, the curing step can be performed under an inert atmosphere. An "inert atmosphere," as used herein, is a gas or mixture of gases, substantially devoid of gases containing oxygen and gases containing carbon. The inert atmosphere can comprise nitrogen, a noble gas, or a mixture thereof. In one embodiment, the inert atmosphere consists essentially of nitrogen, with other components, if any, being typical contaminants of industrial-grade or research-grade nitrogen.

Once cured, the substrate comprising the anti-reflective coating can be used in further substrate processing steps, such as photolithography.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Siloxane resin samples 1-1 through 1-11 were prepared by combining in a glass container components (A) 2-ethoxyethanol, (B) 8.4% HCl/H2O solution, (C) triethoxysilane, (D) tetraethoxysilane and (E) methyltrimethoxysilane in the amounts described in Table 1. The resulting solution was heated under reflux for 10 minutes. (F) 10% aqueous sulfuric acid was added according to Table 1. The reaction product was stripped of volatiles under reduced pressure at 70° C. until the solid content became 2.64%.

TABLE 1

Preparation of siloxane resin samples.

| Sample | Resin type | Wt parts (A) | Wt parts (B) | Wt parts (C) | Wt parts (D) | Wt parts (E) | Wt parts (F) |
|---|---|---|---|---|---|---|---|
| 1-1 | (HSiO3/2)n | 91.07 | .74 | 6.19 | 0 | 0 | 0.75 |
| 1-2 | (HSiO3/2)0.8(SiO4/2)0.2 | 91.08 | 2.76 | 4.67 | 1.49 | 0 | 0.75 |
| 1-3 | (HSiO3/2)0.6(SiO4/2)0.4 | 91.11 | 2.77 | 3.31 | 2.80 | 0 | 0.75 |
| 1-4 | (HSiO3/2)0.4(SiO4/2)0.6 | 91.13 | 2.79 | 2.10 | 3.99 | 0 | 0.75 |
| 1-5 | (HSiO3/2)0.2(SiO4/2)0.8 | 91.15 | 2.80 | 1.00 | 5.06 | 0 | 0.75 |
| 1-6 | (SiO4/2)n | 91.16 | 2.81 | 0 | 6.03 | 0 | 0.75 |
| 1-7 | (MeSiO3/2)n | 93.77 | 2.17 | 0 | 0 | 4.06 | 0.75 |
| 1-8 | (MeSiO3/2)0.75(SiO/4 2)0.25 | 93.10 | 2.33 | 0 | 1.54 | 3.02 | 0.75 |
| 1-9 | (MeSiO3/2)0.5(SiO4/2)0.5 | 92.45 | 2.49 | 0 | 3.06 | 2.00 | 0.75 |
| 1-10 | (MeSiO3/2)0.25(SiO4/2)0.75 | 91.80 | 2.65 | 0 | 4.55 | 0.99 | 0.75 |
| 1-11 | (MeSiO3/2)0.5(HSiO3/2)0.5 | 92.58 | 2.42 | 2.73 | 0 | 2.27 | 0.75 |

EXAMPLE 2

Dyed siloxane resin samples 2-1 to 2-6 were prepared by mixing 1.42 weight parts of 9-anthracenemethanol, 100 weight parts of a resin solution and 11.4 weight parts of water according to Table 2 and heating the mixtures under reflux for 40 minutes. The products were filtered through 0.2 μm filters, spin-coated on silicon wafers at 2000 RPM, cured at 200° C. for 3 minutes in nitrogen using a Rapid Thermal Processor. The cured coatings were tested for optical extinction coefficients using a Woolam Elliposometer, and tested for HF etch rate by treating the films with 0.2% aqueous HF for 2 minutes, rinsing with water and then 2-ethoxyethanol solvent, and testing thicknesses before and after etch. The results were summarized in Table 2. Example 2-1 to 2-6 demonstrated that dyed siloxane resins containing substantially no Si—C bonds in an organic solvent led to films that can retain their optical properties after thermal cure and have high HF etch rates.

TABLE 2

Preparation and characterization of dyed siloxane resin samples having substantially no Si—C bonds. (K is extinction coefficient).

| ARC Sample | Resin precursor | Resin precursor type | K@ 248 nm Cured at 200° C. | HF Etch rate Å/min |
|---|---|---|---|---|
| 2-1 | 1-1 | (HSiO3/2)n | 0.31 | >190 |
| 2-2 | 1-2 | (HSiO3/2)0.8(SiO4/2)0.2 | 0.29 | >190 |
| 2-3 | 1-3 | (HSiO3/2)0.6(SiO4/2)0.4 | 0.30 | >190 |
| 2-4 | 1-4 | (HSiO3/2)0.4(SiO4/2)0.6 | 0.29 | >190 |
| 2-5 | 1-5 | (HSiO3/2)0.2(SiO4/2)0.8 | 0.36 | >190 |
| 2-6 | 1-6 | (SiO4/2)n | 0.25 | >190 |

COMPARATIVE EXAMPLE 3

Dyed siloxane resin samples C3-1 to C3-5 were prepared by mixing 1.42 weight parts of 9-anthracene-methanol, 100 weight parts of a resin solution having substantial Si—C bonds shown in Table 3, and 11.4 weight parts of water and heating the mixtures under reflux for 40 minutes. The products were filtered through 0.2 μm filters, spin-coated on silicon wafers at 2000 RPM, and cured at 200° C. for 3 minutes in nitrogen using a Rapid Thermal Processor. The cured coatings were tested for optical extinction coefficients using a Woolam Elliposometer and tested for HF etch rates by treating the films with 0.2% aqueous HF for 2 minutes, rinsing with water and then 2-ethoxyethanol solvent, and testing thicknesses before and after etch. The results were summarized in Table 3. Comparative Examples C3-1 through C3-5 demonstrated that siloxane resin-based compositions having large fractions of Si—C bonds led to films having low HF etch rates.

TABLE 3

Preparation and characterization of dyed siloxane resin samples having large fractions of Si—C bonds. (K is extinction coefficient).

| ARC Sample | Resin precursor | Resin precursor type | K@ 248 nm Cured at 200° C. | HF Etch rate Å/min |
|---|---|---|---|---|
| C3-1 | 1-7 | (MeSiO3/2)n | 0.18 | 15 |
| C3-2 | 1-8 | (MeSiO3/2)0.75(SiO4/2)0.25 | 0.25 | 17 |
| C3-3 | 1-9 | (MeSiO3/2)0.5(SiO4/2)0.5 | 0.29 | 0 |
| C3-4 | 1-10 | (MeSiO3/2)0.25(SiO4/2)0.75 | 0.24 | 39 |
| C3-5 | 1-11 | (MeSiO3/2)0.5(HSiO3/2)0.5 | 0.20 | 56 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A composition, comprising a siloxane resin having the formula:

$(HSiO_{3/2})_a(SiO_{4/2})_b(HSiX_{3/2})_c(SiX_{4/2})_d$, wherein each X is independently —O—, —OH, or —O—$(CH_2)_m$—$Z_n$, provided at least one X is —O—$(CH_2)_m$—$Z_n$, wherein each m is independently an integer from 1 to about 5, Z is an aromatic moiety, and each n is independently an integer from 1 to about 6; $0.3 \leq a \leq 0.7$, $0.3 \leq b \leq 0.7$, $0 < (c+d) \leq 0.4$, and $a+b+c+d=1$.

2. The composition of claim 1, wherein each X is independently —O—, —OH, or —O—$(CH_2)$—$Z_3$, provided at least one X is —O—$(CH_2)_m$—$Z_3$.

3. The composition of claim 2, wherein —$(CH_2)_m$—$Z_3$ is a 9-anthracene methylene moiety.

4. The composition of claim 1, further comprising an organic solvent.

5. The composition of claim 4, wherein the organic solvent is 2-ethoxyethanol, 1-methoxy-2-propanol, or propylene glycol monoether.

6. A method for preparing a dyed siloxane resin composition according to claim 1, comprising:
   (i) reacting a trialkoxysilane, a tetraalkoxysilane, and water, in the presence of a hydrolysis catalyst, to form a first siloxane resin having $HSiO_{3/2}$, $SiO_{4/2}$, $HSiX'_{3/2}$, and $SiX_{4/2}$ units, wherein X' is independently —O— or —OH, and having substantially no silicon-carbon bonds; and
   (ii) reacting the first siloxane resin with a compound having the formula HO—$(CH_2)_m$—$Z_n$, wherein each m is independently an integer from 1 to about 5, Z is an aromatic moiety, each n is independently an integer from 1 to about 6, $0.3 \leq a \leq 0.7$, $0.3 \leq b \leq 0.7$, $0 < (c+d) \leq 0.4$, and $a+b+c+d = 1$, to form the dyed siloxane resin composition.

7. The method of claim 6, wherein the hydrolysis catalyst is a base or an acid.

8. The method of claim 7, wherein the hydrolysis catalyst is a mineral acid.

9. The method of claim 6, wherein reacting step (ii) is performed at a temperature from about 25° C. to about the boiling temperature of a reaction component and for a duration of about 10 min to about 60 min.

10. The method of claim 6, wherein reacting step (ii) is performed in the presence of a mineral acid.

11. The method of claim 6, wherein reacting steps (i) and (ii) are performed simultaneously.

12. A dyed siloxane resin composition, prepared by the method of claim 6.

13. A method of preparing an anti-reflective coating on a substrate, comprising:
   (i) coating a composition onto a substrate to form a coated substrate, wherein the composition comprises a siloxane resin having the formula $(HSiO_{3/2})_a(SiO_{4/2})_b(HSiX_{3/2})_c(SiX_{4/2})_d$, wherein each X is independently —O—, —OH, or —O—$(CH_2)_m$—$Z_n$, provided at least one X is —O—$(CH_2)_m$—$Z_n$, wherein each m is independently an integer from 1 to about 5, Z is an aromatic moiety, and each n is independently an integer from 1 to about 6; $0.3 \leq a \leq 0.7$, $0.3 \leq b \leq 0.7$, $0 < (c+d) \leq 0.4$, and $a+b+c+d = 1$; and
   (ii) curing the coated substrate, to form the anti-reflective coating on the substrate.

14. The method of claim 13, wherein the curing step (ii) comprises heating the coated substrate at about 50° C. to about 300° C. for a duration of about 0.1 min to about 60 min.

15. The method of claim 14, wherein the curing step (ii) comprises heating the coated substrate at about 150° C. to about 275° C. for a duration of about 1 min to about 5 min.

16. The method of claim 14, wherein the curing step (ii) is performed under an inert atmosphere.

17. The method of claim 16, wherein the inert atmosphere consists essentially of nitrogen.

18. A semiconductor wafer, prepared according to the method of claim 13.

* * * * *

UNITED STATES PATENT AND TRADEMARK OFFICE
CERTIFICATE OF CORRECTION

PATENT NO. : 7,368,173 B2 Page 1 of 1
APPLICATION NO. : 10/552432
DATED : May 6, 2008
INVENTOR(S) : Bianxiao Zhong and Eric S. Moyer It is certified that error appears in the above-identified patent and that said Letters Patent is hereby corrected as shown below:

In column 9, line 13, delete "$SiX_{4/2}$" and insert -- $SiX'_{4/2}$ --.

Signed and Sealed this

Fifteenth Day of July, 2008

JON W. DUDAS
*Director of the United States Patent and Trademark Office*